United States Patent Office 3,472,896
Patented Oct. 14, 1969

3,472,896
AMINOALKYL PENTACHLOROPHENYL ETHERS
Shigeo Seki, Tokyo, and Kazuyuki Kamata, Yokohamashi, Japan, assignors to Meiji Seika Kaisha, Ltd., Tokyo, Japan, a corporation of Japan
No Drawing. Filed June 15, 1967, Ser. No. 646,190
Claims priority, application Japan, July 21, 1966, 41/47,369
Int. Cl. C07c *93/04, 93/14*; A01n *9/20*
U.S. Cl. 260—570.7     4 Claims

ABSTRACT OF THE DISCLOSURE

Aminoalkyl pentachlorophenyl ethers represented by the general formula:

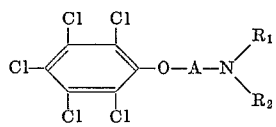

wherein A stands for a chain selected from the group consisting of ethylene, trimethylene and propylene

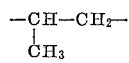

and $R_1$ is hydrogen and $R_2$ is selected from the group consisting of hydrogen, alkyl, cycloalkyl, aralkyl and phenyl radicals which are new and useful as antimicrobial agent and the process for controlling rice blast of rice plants in rice paddy fields without killing fishes in the field by contacting the rice plant with the above-mentioned aminoalkyl pentachlorophenyl ethers.

CROSS-REFERENCE TO RELATED APPLICATION

In a co-pending U.S. application Ser. No. 639,063 (corresponding to Japanese patent application No. 32,063/66), we describe and claim a method for the production of alkylaminoalkyl pentachlorophenyl ethers by reacting an excess of an alkali metal salt of pentachlorophenol with a hydrohalogenic acid salt of the corresponding alkylaminoalkyl halide in a solvent consisting of a lower alkyl alcohol or dioxane. This method may be carried out in a simple way and with a high yield of the desired product, so that this method may be said to be a most economic one for producting alkylaminoalkyl pentachlorophenyl ethers. However, this method suffers from a drawback that it can be applied only to the production of a restricted scope of the compounds. Thus, with this method it is not possible to produce such aminoalkyl pentachlorophenyl ethers having a primary or secondary amine group in which both or any one of $R_1$ and $R_2$ appearing in the aforesaid general formula are or is hydrogen. This is because the free aminoalkyl halide bearing the amino group in the form of primary or secondary amine is very unstable as is well known to chemists.

In contrast to this, with the process of the present invention it is possible to produce optionally the aminoalkyl pentachlorophenyl ethers bearing any of the primary, secondary and tertiary amino group by reacting an appropriate primary, secondary or tertiary amine with an appropriate aryl sulfonate of pentachlorophenoxy alkanol. This is an advantage of the process of the present invention.

BACKGROUND OF THE INVENTION

The present invention relates to new aminoalkyl pentachlorophenyl ethers and to a process for the production of aminoalkyl pentachlorophenyl ethers in a simple way and with an economic advantage by reacting an aryl sulfonate of pentachlorophenoxy alkanol with an appropriate amine from which the aminoalkyl radical in the desired product may be derived.

It is known that N,N-di-ethylaminoethyl pentachlorophenyl ether may be produced by reacting sodium salt of pentachlorophenol with beta-di-ethylaminoethyl chloride in a solvent consisting of ethyl ether (see the report of D. J. Drain et al. in the "Journal of Chemical Society" (1949) 2680–2683). However, this report did neither mention the yield of that product nor suggest any antimicrobial activity of the aminoalkyl pentachlorophenyl ethers. The method of D. J. Drain et al. is difficult to give a usefully high yield of the product and is very expensive to be carried out because it needs to proceed an extra step for preparing the starting material beta-diethylaminoethyl chloride in the free state from its hydrohalogenic acid salts which are commonly supplied, and because this extra step for the preparation of the starting material demands the use of expensive reagents and some complicated procedure for recovery of the material.

SUMMARY OF THE INVENTION

It has now been found in accordance with the present invention that new aminoalkyl pentachlorophenyl ethers of the general formula:

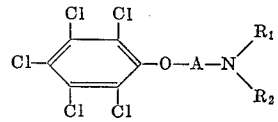

wherein A, $R_1$ and $R_2$ have the same meanings as defined hereinbefore exhibit some useful antimicrobial activity against, for example, *Piricularia oryzae, Staphylococcus aureus, Streptococcus haemolyticus, Diplococcus pneumoniae, Bacillus subtilis, Salmonella typhi* and *Escherichia coli* but they are little toxic to fishes. In contrast, we have found that the known beta-di-ethylaminoethyl pentachlorophenyl ether can show a too high toxicity to fishes, though it exhibits antimicrobial activity, so that it cannot be used in agricultural application and particularly for control of rice blast in paddy field of rice. However, the new ether compounds according to the present invention may be useful as an antimicrobial agent for the agricultural and other applications.

Furthermore, it has now been found in accordance with the present invention that it is possible to produce the general aminoalkyl pentachlorophenyl ethers in a simple and economic way but in a high yield when the reaction is carried out according to the process of the present invention.

It is an object of the present invention to provide new aminoalkyl pentachlorophenyl ethers which exhibit usefully high antimicrobial activity against pest microorganisms but little toxicity to fishes and which therefore is useful in controlling rice blast in particular.

It is a further object of the present invention to provide a general and economic process for the production of unsubstituted, N-monomsubstituted or N,N-di-substituted aminoalkyl pentachlorophenyl ethers which may be carried out in a simple way using an inexpensive compound as the starting materials.

Still further objects and advantages of the present invention will become more apparent from the following more detailed description of the present invention.

According to a feature of the present invention there are provided new aminoalkyl pentachlorophenyl ethers represented by the general formula:

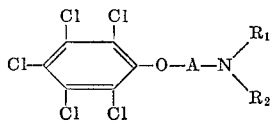

wherein A stands for a chain selected from the group consisting of ethylene, trimethylene and propylene; and $R_1$ is hydrogen and $R_2$ is selected from the group consisting of hydrogen, alkyl, cycloalkyl, aralkyl and phenyl radicals.

According to a further feature of the present invention there is provided a process for the production of aminoalkyl pentachlorophenyl ethers of the general formula:

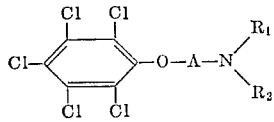

wherein A stands for a chain selected from the group consisting of ethylene, trimethylene and propylene; and $R_1$ and $R_2$ may be the same or different and are selected from the group consisting of hydrogen, alkyl, cycloalkyl, aralkyl and phenyl radicals; and $R_1$ and $R_2$ together with the adjacent nitrogen atom may form a heterocyclic ring selected from the group consisting of pyrrolidine, piperidine and morpholine, which comprises reacting an aryl sulfonate of pentachlorophenoxy alkanol of the general formula:

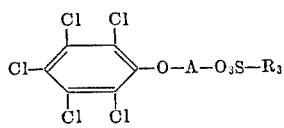

wherein A has the same meaning as defined above and $R_3$ stands for an aryl radical, with an amine of the formula:

wherein $R_1$ and $R_2$ have the same meaning as defined hereinbefore.

DESCRIPTION OF THE PREFERRED EMBODIMENT

When $R_1$ and $R_2$ stand for an alkyl radical in the process of the present invention, they may be a lower alkyl group containing 1 to 4 carbon atoms. When $R_1$ and $R_2$ represents a cycloalkyl radical, they may be cyclohexyl, cyclopentyl and the like. $R_2$ may also be an aralkyl radical such as benzyl.

Among the ether compounds as produced by the process of the invention, those having a teritary amine group in which both of $R_1$ and $R_2$ represent no hydrogen are generally little toxic to fishes and therefore may be suitable for use in controlling diseases of plants and particularly rice blast (*Piricularia oryzae*). This is in marked contrast to the known N,N-di-ethylaminoethyl pentachlorophenyl ether which is highly toxic to fishes and therefore unsuitable for use in controlling rice blast in paddy field of rice plant.

We have tested some of the ether compounds produced by the process of the present invention and the known N,N-di-ethylaminoethyl pentachlorophenyl ether with respect to their toxicity against red killifish by applying in different concentrations as indicated in Table 1 below and estimating percentages of the fishes killed 24 hours and 48 hours after the application of the compounds. The results of test obtained are tabulated in Table 1.

TABLE 1.—TOXICITY OF AMINOALKYL PENTACHLOROPHENYL ETHERS TO RED KILLIFISH

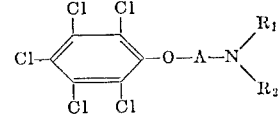

| Chain A | Group—N $R_1 R_2$ | Concentration in p.p.m. | Percentages of fish killed after application 24 hours | 48 hours |
|---|---|---|---|---|
| Ethylene | Di-n-butylamino | 1 | 0 | 0 |
|  |  | 5 | 0 | 0 |
| Do | Piperidino | 1 | 0 | 0 |
|  |  | 5 | 0 | 0 |
| Do | Morpholino | 1 | 0 | 0 |
|  |  | 5 | 0 | 0 |
| Do | Pyrrolidino | 1 | 0 | 0 |
|  |  | 5 | 0 | 20 |
| Do | Dibenzylamino | 1 | 0 | 0 |
|  |  | 5 | 0 | 0 |
| Trimethylene | Piperidino | 1 | 0 | 0 |
|  |  | 5 | 0 | 0 |
| Propylene | Piperidino | 1 | 0 | 0 |
|  |  | 5 | 0 | 0 |
| Ethylene | Di-ethylamino | 1 | 60 | 90 |
|  |  | 5 | 100 | — |

Among the ether compounds produced by the process of the present invention, those having primary or secondary amine group in which any one or both of $R_1$ and $R_2$ represents or represent hydrogen, exhibit very much higher antimicrobial activity against pathogenic bacteria than the known N,N-di-ethylaminoethyl pentachlorophenyl ether. We have tested the antimicrobial activity of some of the ether compounds and the known N,N-di-ethylaminoethyl pentachlorophenyl ether by determining the minimum concentrations (in gamma per cc.) of them inhibitory to the growth of bacteria in vitro. The results of test obtained are shown in Table 2 below.

TABLE 2—MINIMUM INHIBITORY CONCENTRATION OF AMINOETHYL PENTACHLOROPHENYL ETHER OF THE FORMULA

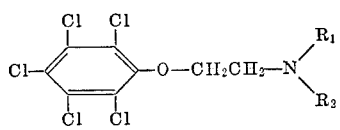

| | Minimum inhibitory concentration of the compounds | | | | | |
|---|---|---|---|---|---|---|
| Group $-NR_1R_2$ | *Staphylococcus aureus* 209-P | *Streptococcus haemolyticus* cook | *Diplococcus pneumoniae* Type-1 | *Bacillus subtilis* PCI-219 | *Salmonella typhi* 0-901-W | *Escherichia coli communis* |
| Amino | 6.25 | 3.12 | 1.56 | 3.12 | 6.25 | 50 |
| n-Butylamino | 12.5 | 6.25 | 3.12 | 12.5 | 12.5 | 50 |
| Cyclohexylamino | 12.5 | 6.25 | 3.12 | 25 | 25 | 100 |
| Phenylamino | 12.5 | 6.25 | 6.25 | 12.5 | 12.5 | 100 |
| Di-ethylamino | 50 | 50 | 50 | 50 | 100 | 100 |

Examples of the aminoalkyl pentachlorophenyl ethers produced by the process of the present invention include the following substances:

Beta-aminoethyl pentachlorophenyl ether.
Beta-n-butyl aminoethyl pentachlorophenyl ether.
Beta-cyclohexylaminoethyl pentachlorophenyl ether.
Beta-anilinoethyl pentachlorophenyl ether.
Beta-N,N-dimethylaminoethyl pentachlorophenyl ether.
Beta-N,N-di-n-butylaminoethyl pentachlorophenyl ether.
Beta-morpholinoethyl pentachlorophenyl ether.
Beta-pyrrolidinoethyl pentachlorophenyl ether.
Beta-piperidinoethyl pentachlorophenyl ether.

Gamma-piperidinopropyl pentachlorophenyl ether.
Beta-methyl-beta-piperidinoethyl pentachlorophenyl ether, and
Beta-N,N-dibenzylaminoethyl pentachlorophenyl ether.

The aminoalkyl pentachlorophenyl ethers produced by the process of the present invention may be admixed with an appropriate inert diluent or carrier to form a composition which may conveniently be applied to the purposes as desired. The inert diluent or carrier may be either solid or liquid. If the composition is of agricultural utility, diluent may be for example, water, talc, clay and others such as conventionally employed in the fomulation of usual pesticidal compositions.

In accordance with the process of the present invention, the reaction may be carried out either in water or in an appropriate organic solvent such as dioxane or in an excess of the amine which is being used as the reactant. It is preferred to carry out the reaction in the presence of an alkali metal hydroxide and/or ammonium hydroxide in order to promote the reaction. Furthermore it is particularly preferable to perform the reaction in a solvent consisting of water or dioxane or a mixture thereof in the presence of ammonium hydroxide or an alkali metal hydroxide and a slight excess of the amine which is used as the reactant. In the process of the invention the reaction may be effected at room temperature but preferably may be promoted by application of heat to a temperature of about 80 to 90° C.

As the aryl sulfonate which may be used as the reactant in the process of the present invention there may be mentioned benzene sulfonate, naphthalene sulfonate and p-toluene sulfonate and the like. It is most economic to use p-toluene sulfonate as this is available at the cheapest cost. p-Toluene sulfonate of the pentachlorophenoxy alkanol may readily and inexpensively be prepared by reacting an appropriate aminoalkyl pentachlorophenoxy alkanol with p-toluene sulfochloride which may be recovered in large quantity as by-product in the manufacture of saccharin, namely, benzosulfimide.

p - Toluene sulfonates of beta - pentachlorophenoxy ethanol, gamma-pentachlorophenoxy propanol and alpha-methyl-beta-pentachlorophenoxy ethanol which may be used as the reactant in the process of the present invention are also new compounds and show a melting point of 95 to 96° C., 102 to 102.5° C. and 122 to 123° C., respectively.

The invention is now illustrated with reference to the following examples but to which the scope of the invention is limited in no way.

Example 1

In an autoclave, a solution comprising 24 grams of beta-pentachlorophenoxyethyl p-toluene sulfonate, 50 cc. of dioxane, 40 cc. of concentrated aqueous ammonia, 12 grams of sodium hydroxide and 20 cc. of water is heated at 80 to 90 ° C. for 2 hours under agitation. The autogenous pressure is released from the reactor, and the reaction mixture is then distilled under reduced pressure to remove the excess of ammonia and the solvents. The residue is subsequently added with 200 cc. of water and extracted with toluene. The extract is distilled to remove toluene and the residue is dissolved in n-hexane by heating. Cooling of the solution gives a crystalline product which, on recrystallization from n-hexane, yields about 10 grams of beta-aminoethyl pentachlorophenyl ether of a melting point of 134 to 134.5° C.

Example 2

In an autoclave, a solution comprising 24 grams of beta-pentachlorophenoxyethyl p-toluene sulfonate, 8 grams of n-butyl amine, 12 grams of sodium hydroxide and 20 cc. of water in 50 cc. of dioxane is heated at 80° C. for 2 hours under stirring. The autogenous pressure is then released from the reactor and the reaction mixture is distilled under reduced pressure to remove the solvents. The residue is added with 150 cc. of water and the mixture is then extracted with toluene. The extract is distilled to remove toluene and the residue dissolved in ethanol. When the solution is cooled by ice there is deposited a crystalline product. Recrystallization of this product from ethanol gives about 13 grams of beta-n-butylaminoethyl pentachlorophenyl ether of a melting point of 28 to 29° C.

Example 3

A solution comprising 24 grams of beta-pentachlorophenoxyethyl p-toluene sulfonate, 10 grams of cyclohexylamine, 8 grams of sodium hydroxide and 15 cc. of water in 50 cc. of dioxane is heated at 85° C. for 2 hours under stirring. The reaction mixture is then distilled under reduced pressure to remove the solvent. The residue is added with 150 cc. of water and then extracted with toluene. Toluene is distilled off from the resulting extract and the remaining material is dissolved in hot ethanol. Ice cooling of the solution brings about deposition of a crystalline product which, on recrystallization from ethanol, yields about 14 grams of beta-cyclohexylaminoethyl pentachlorophenyl ether of a melting point of 53 to 53.5° C.

Example 4

A solution comprising 24 grams of beta-pentachlorophenoxyethyl p-toluenesulfonate, 10 grams of aniline, 8 grams of sodium hydroxide, 15 cc. of water in 50 cc. of dioxane is heated at 80 to 90° C. for 2 hours under stirring. The reaction mixture is then distilled under reduced pressure to remove the solvent. The residue is added with 150 cc. of water and subsequently extracted with toluene. Toluene is distilled off from the resultant extract and the residue is dissolved in hot ethanol. Ice cooling of the solution brings about deposition of a crystalline product which, on recrystallization from ethanol, gives about 13 grams of beta-anilinoethyl pentachlorophenyl ether of a melting point of 93 to 93.5° C.

Example 5

In an autoclave a solution of 24 grams of beta-pentachlorophenoxyethyl p-toluenesulfonate in 50 cc. of dioxane and 20 cc. of an aqueous solution of 40% dimethyl amine are heated at 80 to 90° C. for 2 hours under agitation. The autogenous pressure is then released from the reactor and the reaction mixture is cooled and distilled under reduced pressure to remove the solvent and the excess of the amine. The residue is added with 200 cc. of water and then extracted with toluene. Toluene is distilled off from the resulting extract and the residue is recrystallized from methanol to give about 15 grams of beta-N,N-dimethyl-aminoethyl pentachlorophenyl ether of a melting point of 72 to 73° C.

Example 6

24 grams of beta-pentachlorophenoxyethyl p-toluenesulfonate in 100 cc. of di-n-butyl amine are heated at 90 to 95° C. for 4 hours under stirring. The reaction mixture is cooled and then distilled under reduced pressure to remove the excess of the amine. The residue is added with 150 cc. of water and the mixture is extracted with toluene. The extract is distilled to remove toluene and the resulting residue is recrystallized from isopropanol to yield about 15 grams of beta-di-n-butylaminoethyl pentachlorophenyl ether of a melting point of 30 to 31° C.

Example 7

A solution of 144 grams of beta-pentachlorophenoxyethyl p-toluene sulfonate in 300 cc. of dioxane, 78 grams of morpholine and a solution of 36 grams of sodium hydroxide in 60 cc. of water are heated together at 80° C. for one hour under agitation. The solvent is distilled off from the reaction mixture under reduced pressure, and the residue is added with 500 cc. of water and stirred. The mixture is extracted with toluene and the extract is distilled to remove the toluene. Recrystallization of the residue from isopropanol gives about 91 grams of beta-morpholinoethyl pentachlorophenyl ether of a melting point of 87 to 87.5° C.

Example 8

A solution comprising 24 grams of beta-pentachlorophenoxyethyl p-toluenesulfonate, 8 grams of pyrrolidine, 8 grams of sodium hydroxide and 15 cc. of water in 50 cc. of dioxane is heated at 80° C. for one hour under stirring. The reaction mixture is then distilled under reduced pressure to remove the solvent and the residue is added with 150 cc. of water. The mixture is extracted with toluene and the resultant extract is distilled to remove toleune. Recrystallization of the residue from isopropanol gives about 14 grams of beta-pyrrolidinoethyl pentachlorophenyl ether of a melting point of 52.5 to 53.5° C.

Example 9

A solution of 78 grams of piperindine in 600 cc. of dioxane and a solution containing 290 grams of beta-pentachlorophenoxyethyl p-toluene sulfonate and 72 grams of sodium hydroxide in 120 cc. of water are heated at 80° C. for one and a half hour under agitation. The reaction mixture is subsequently distilled under reduced pressure to remove the solvent. The residue is stirred together with one litre of water. The crystalline product which remains un-dissolved is filtered out, washed with water and then dried. Recrystallization from isopropanol gives about 200 grams of beta-piperidinoethyl pentachlorophenyl ether of a melting point of 69 to 70° C.

Example 10

24 grams of beta-pentachlorophenoxyethyl p-toluenesulfonate are added to 100 cc. of piperidine and the mixture is heated at 85° C. for 2 hours under agitation. The excess of piperidine is distilled off from the reaction mixture under reduced pressure. The residue is added to 100 cc. of water and the mixture is stirred. The crystalline product remaining un-dissolved is filtered out, washed with water and then dried. Recrystallization of the product from isopropanol gives about 17 grams of beta-piperidinoethyl penta-chlorophenyl ether.

Example 11

A solution of 24 grams of gamma-pentachlorophenoxypropyl p-toluenesulfonate in 50 cc. of dioxane together with a solution comprising 10 grams of piperidine, 8 grams of sodium hydroxide and 15 cc. of water is heated at 80 to 90° C. for a 2 hours under stirring. The reaction mixture is then distilled under reduced pressure to remove the solvent. The residue is added with 150 cc. of water and stirred. The mixture is subsequently extracted with toluene, and to the extract is added an amount of a diluted hydrochloric acid. The admixture is thoroughly shaken, and the aqueous layer is removed and evaporated to dryness under reduced pressure. Recrystallization of the residue from ethanol yields about 15 grams of gamma-piperidino-propyl pentachlorophenyl ether hydrochloride of a melting point of 223.5 to 224.5° C.

Example 12

A solution of 24 grams of alpha-methyl-beta-pentachlorophenoxyethyl p-toluenesulfonate in 50 cc. of dioxane together with a solution comprising 10 grams of piperidine, 12 grams of sodium hydroxide and 20 cc. of water is heated at 90° C. for 2 hours under agitation. The reaction mixture is then distilled under reduced pressure to remove the solvent, and the residue is added with 150 cc. of water and then acidified by addition of concentrated hydrochloric acid. The solution is cooled by ice and a crystalline product deposited is filtered out, washed with water and dried. Recrystallization from ethanol gives about 13 grams of beta-methyl-beta-piperidinoethyl pentachlorophenyl ether of a melting point of 170 to 171° C.

We claim:
1. Aminoalkyl pentachlorophenyl ethers represented by

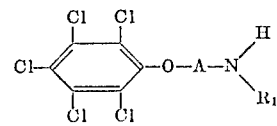

wherein A stand for a chain of 2–3 carbon atoms and $R_1$ is selected from the group consisting of lower alkyl, cyclo lower alkyl of 5 to 6 carbon atoms benzyl and phenyl.

2. Beta-butylaminoethyl pentachlorophenyl ether.
3. Beta-cyclohexylaminoethyl pentachlorophenyl ether.
4. Beta-anilinoethyl pentachlorophenyl ether.

References Cited

UNITED STATES PATENTS 3,142,554  7/1964  Godfrey _____ 260—570.7 X
3,221,054  11/1965  Arnold et al. _____ 260—570. 7

FOREIGN PATENTS 1,020,031  11/1957  Germany.

OTHER REFERENCES

Drain et al., "Jour. Chem. Soc.," London (1949), pp. 2680–83.

ROBERT V. HINES, Primary Examiner.

U.S. Cl. X.R.

260—247.7, 297.7, 326.5, 456, 543; 424—330